Nov. 8, 1955  W. C. SWEET  2,723,031
SIFTING MECHANISMS
Filed May 17, 1954  2 Sheets-Sheet 1
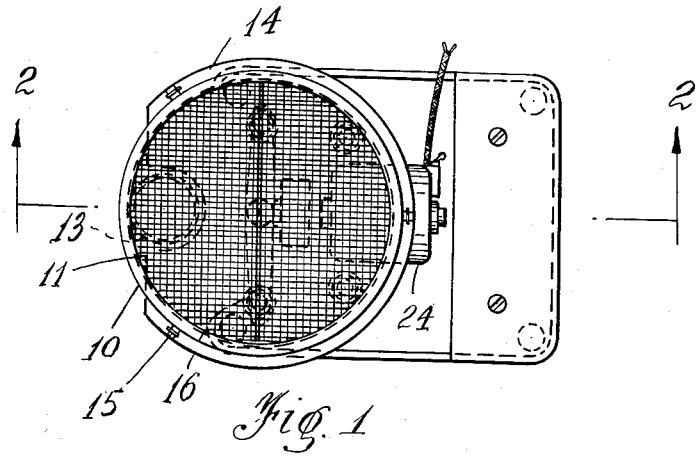
Fig. 1
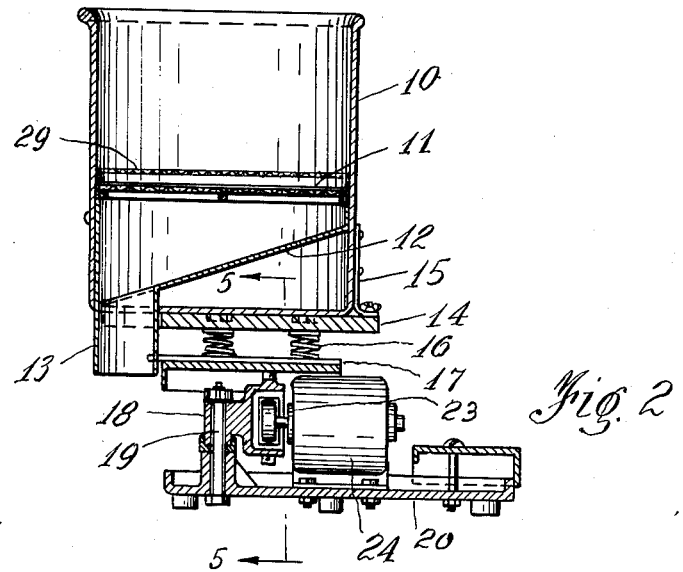
Fig. 2
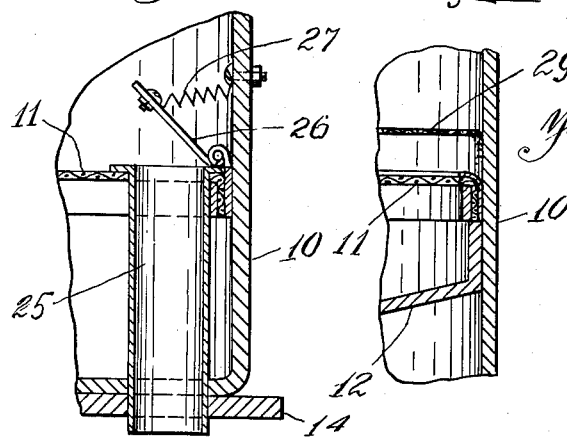
Fig. 4
Fig. 3
Webster C. Sweet
INVENTOR.
BY Ralph Donath
Attorney Nov. 8, 1955
W. C. SWEET
2,723,031
SIFTING MECHANISMS
Filed May 17, 1954
2 Sheets-Sheet 2
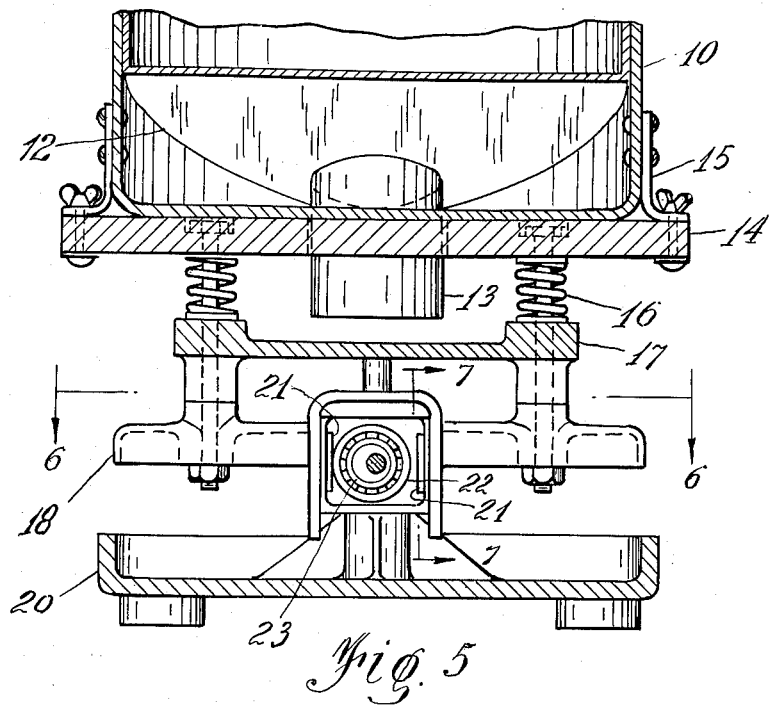
Fig. 5
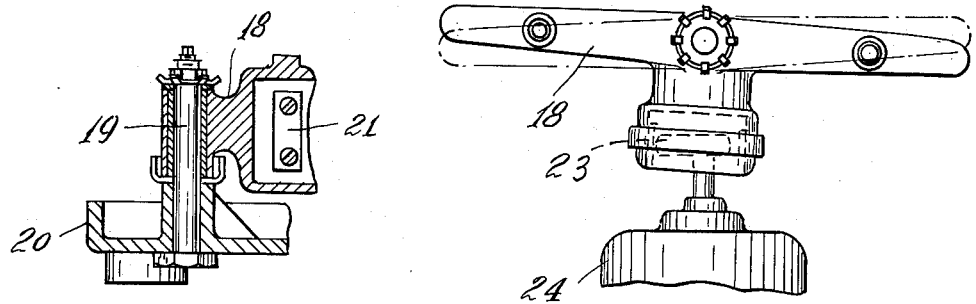
Fig. 7
Fig. 6
Webster C. Sweet
INVENTOR.
BY Ralph Donath
Attorney

United States Patent Office 2,723,031
Patented Nov. 8, 1955

2,723,031

SIFTING MECHANISMS

Webster C. Sweet, Beaver Falls, Pa.

Application May 17, 1954, Serial No. 430,247

5 Claims. (Cl. 209—335)

This invention relates to sifting mechanisms and particularly to an apparatus for rapidly sifting and aerating large quantities of flour and the like materials.

It has long been known that many materials are improved by sifting and aerating. This is particularly true for flour used in the making of pastry and fine baked goods. There has, however, been no satisfactory, simple sifting mechanism which would be adapted to handling large quantities of flour such as are needed in commercial bakeries, institutions and the like.

It is an object of the present invention to provide a simple, portable sifting and aerating mechanism.

A further object of the invention is to provide an automatic means for discharging tailings remaining after the sifting operation.

Another object of the invention is to provide a sifting mechanism wherein the sifted flour and tailings are separated and automatically discharged into separate containers.

A still further object of the invention is to provide a sifter having a container mounted for reciprocation in the horizontal direction, a screen in the container spaced from the bottom thereof and inclined discharge means receiving the sifted material and delivering it to a discharge point.

Other objects, advantages and features of the invention will become apparant from a consideration of the following description and accompanying drawings in which:

Figure 1 is a top plan view of a sifting mechanism according to this invention.

Figure 2 is a section on the line 2—2 of Figure 1.

Figure 3 is a segmental section of the wall of the container of Figure 1 showing the arrangement of screen and discharge chute.

Figure 4 is a segmental section through the tailings discharge mechanism.

Figure 5 is a section on the line 5—5 of Figure 2.

Figure 6 is a section on the line 6—6 of Figure 5.

Figure 7 is a section on the line 7—7 of Figure 5.

Referring to the drawings there is illustrated a bowl 10, open at the top to receive the material to be sifted. A screen 11 is secured in the bowl intermediate the top and bottom. A discharge chute 12 is fixed in the bowl beneath the screen 11 and is connected to a discharge spout 13 delivering sifted material outside the bowl 10. The bowl 10 is mounted on a bowl support platform 14 by means of brackets 15. The bowl support platform 14 is in turn supported on springs 16 on a spring plate 17. The spring plate 17 is mounted on a cross bar 18 pivoted on a shaft 19 in a base 20. The cross bar 18 is provided with opposed cam surfaces 21 and replaceable cam shoes 22. An eccentric ball bearing cam 23 driven by an electric motor 24 alternately contacts the opposed cam shoes causing the cross bar to oscillate about the pivot pin 19.

A tailing discharge chute 25 is provided at one edge of the screen to discharge through the bottom of the bowl 10. A gate 26 is pivoted at the edge of the chute 25 adjacent the side wall of the bowl and is adapted to close the tailings chute. A spring 27 is fixed to the gate 26 to hold it in the normally open position.

The operation of the mechanism of this invention is as follows: Flour or other material to be sifted is poured into the top of the bowl 10 onto the screen 11. The weight of the flour causes the gate 26 to close against the force of the biasing spring 27. The drive motor 24 turns the cam 23 which causes the cross bar 18 to oscillate about the pivot pin 19. The bowl 10 through its connection with the platform 14 and spring plate 17 moves in unison with the cross bar so that the material in the bowl is shaken through the screen 11 onto the discharge chute 12 and out of spout 13. As the material is screened the weight on the gate 26 becomes less and less until the point is reached where virtually all the material is discharged and the spring 27 is able to open the gate 26 permitting the tailings remaining at the end of the sifting operation to be automatically discharged through the tailings chute 25.

If a finer screening is desired or a separation into two fractions of different degrees of fineness is desired, a second screen 29 can be installed directly above the screen 11 to rest upon the framework supporting screen 11.

While a preferred embodiment of this invention has been illustrated and described it will be understood that it may be otherwise embodied within the scope of the following claims.

I claim:

1. A sifting mechanism comprising a bowl, a screen in said bowl, inclined discharge means beneath the screen receiving material passing through the screen to discharge it from the bowl, a base member, a mounting plate pivoted on a base member, resilient means connecting the bowl on said mounting plate, a closed cam surface attached to the mounting plate and eccentric means rotatable within said cam surface to oscillate the mounting plate about its pivot on the base.

2. A sifting mechanism as claimed in claim 1 having a gate at one edge of the screen, a discharge chute connecting said gate to the exterior of the bowl and biasing means normally holding the gate in the open position.

3. A sifting mechanism as claimed in claim 1 having a gate hinged at one edge of the screen, a discharge chute connecting said gate to a discharge opening in the exterior of the bowl and spring means connected to said gate tending to hold the gate in the open position.

4. A sifting mechanism comprising a bowl, a screen in said bowl, inclined discharge means beneath the screen receiving material from the screen to discharge it from the bowl, a bowl support platform removably holding the bowl, a mounting plate, a cross bar pivoted in a base member attached to said mounting plate, resilient connections between the mounting plate and the bowl support platform, a closed cam surface on said cross bar and eccentric means rotatable within said cam surface to oscillate the cross bar about its pivot in the base member whereby the bowl is caused to oscillate in a horizontal plane.

5. A sifting mechanism as claimed in claim 4 having a gate at one edge of the screen, a discharge chute connecting said gate to the exterior of the bowl and biasing means normally holding the gate in open position.

References Cited in the file of this patent

UNITED STATES PATENTS

| 1,286,720 | Mueller | Dec. 3, 1918 |
| 2,058,870 | Hazle | Oct. 27, 1936 |
| 2,093,123 | Battaline | Sept. 14, 1937 |